UNITED STATES PATENT OFFICE.

HARRY BAKER CLAPP, OF WIMBLEDON, ENGLAND, ASSIGNOR TO DUNCAN RAMSAY BLAIR, OF PICCADILLY, LONDON, ENGLAND.

MANUFACTURE OF IRON AND STEEL.

1,330,846. Specification of Letters Patent. Patented Feb. 17, 1920.

No Drawing. Application filed December 23, 1918. Serial No. 268,073.

*To all whom it may concern:*

Be it known that I, HARRY BAKER CLAPP, a subject of the King of Great Britain, residing at 132 Wimbledon Park road, Wimbledon, in the county of Surrey, England, have invented certain new and useful Improvements in or Relating to the Manufacture of Iron and Steel, of which the following is a specification.

This invention relates to the production of iron and steel from iron oxids or ores, more particularly phosphoric, titaniferous and sulfurous iron ores.

According to this invention the oxid or ore in a divided state is intimately mixed with a carboniferous reducing agent and with a chlorid, such as sodium chlorid, capable of forming a silicate with the silica present in the ore or added thereto, and the mixture with suitable slagging material is heated in a furnace to a temperature which, while producing a fluid slag, leaves the reduced metallic iron unmelted and in a spongy condition.

In carrying out the process carbon, in the form, for example, of anthracite dust, is added to the extent of about 30 to 50 per cent. of the weight of iron oxid present in the ore (larger percentages being required for poor than for rich ores) together with a quantity of lime or other slag forming ingredient and with silica (if not already in sufficient quantities in the ore) and after intimate mixing of all the ingredients, preferably in the presence of a moderate percentage of moisture, say from 5 to 10 per cent., the charge is heated in an open hearth furnace, the hearth being preferably composed of chromite or tap cinder or such other composition as will not be affected by either acid or basic slags. The charge should not exceed six inches in thickness and the temperature is raised to approximately 2500° F. with the result that a liquid slag is formed by the reactions of the lime, silica and sodium chlorid or equivalent chlorid, while the metallic iron remains unmelted and in a spongy condition.

With low grade ores a suitable slag can be obtained by additions which make the lime plus the magnesia present equal to the silica plus the alumina, about 10 per cent. sodium chlorid being also added. The proportions will of course vary according to the nature of the ore. It is desirable to mix the ingredients forty-eight hours or more before charging into the furnace. The spongy iron produced is removed from the furnace and subjected to pressure, preferably hydraulic pressure, to expel as much of the slag as possible. Blooms are obtained by this means consisting of practically pure iron with about 5 per cent. of slag intermixed, which blooms may be worked up as finished wrought iron of high quality by known methods or may be charged into a melting furnace with suitable additions, for example, about one third pig iron, for conversion into steel.

It is found that ores high in phosphorus, sulfur and titanium can be converted into high quality acid steel in this manner, owing to the reduction to metal having taken place without fusion and at a temperature at which the impurities above mentioned do not enter into combination with the reduced metal, but remain with the slag, which is removed before the conversion into steel. Iron blooms made according to the present invention have been found to produce a steel having physical properties superior to a steel of similar chemical composition made, according to the usual method, from pig iron and scrap metal. By the use of a chlorid and other suitable slagging material it is possible to obtain an easily fusible slag which is quite liquid at or below a temperature of about 2500° F., leaving practically pure iron free from contamination with the impurities existing in the original ore and adapted equally for utilizing as wrought iron or for conversion into high quality steel.

As a specific example of the application of the process to a particular ore, Java iron sand may be taken, containing about 79 per cent. of iron oxid, about 14½ per cent. of titanium oxid, some silica, alumina and calcium oxid and small quantities of the oxids of sulfur, phosphorus, manganese and magnesium. To a charge of this ore is added about 5 per cent. each of lime, silica (sand) and sodium chlorid, about 20 per cent. coal dust and 10 per cent. water and, after thorough mixing, the mass is charged into an open hearth furnace and heated to a temperature of about 2500° F. for about 4½ hours. The yield of practically pure iron is found to be about 9 cwt. per ton of ore, representing a loss of approximately 12 per cent. of the total available iron in the ore.

In carrying out this process any form of furnace can be utilized if the temperature is under control and the hearth is of such a nature as not to be affected by the slag. The charge of ore is not in contact with the fuel and the heating flame is preferably slightly oxidizing. As already mentioned, it is desirable to provide a certain amount of moisture in the charge, to form steam which doubtless assists in reacting with the heated carbon present to produce carbon monoxid that in turn reduces the iron oxid.

What I claim and desire to secure by Letters Patent of the United States is:—

1. The process for the production of iron from iron oxids or ores which consists in mixing the oxid or ore in a divided state with a carboniferous reducing agent, and heating the mixture together with slagging material including a substantial proportion of sodium chlorid to a temperature which produces a fluid slag that flows from the reduced metallic iron while leaving the latter unmelted and in a spongy condition.

2. The process for the production of iron from iron oxids or ores which consists in mixing the oxid or ore in a divided state with carbon amounting to about 30 to 50 per cent. of the oxid present and with slagging material containing a substantial proportion of sodium chlorid and heating the mixture in a furnace out of contact with the fuel, to a temperature of about 2500° F., the slag melting and flowing from the unmelted, reduced, metallic iron.

3. The process for the production of iron from iron oxids or ores which consists in mixing the oxid or ore in a divided state with a carboniferous reducing agent, and slagging material, including a substantial proportion of sodium chlorid, and heating the mixture moistened with about from 5 to 10 per cent. of moisture, to a temperature which produces a fluid slag that flows from the reduced metallic iron which remains unmelted.

4. A process for the production of steel which consists in mixing iron oxid or ore in a divided state with a carboniferous reducing agent, heating the mixture in a furnace in the presence of slagging material containing a substantial proportion of a sodium chlorid to a temperature which produces a fluid slag but leaves the iron in an unmelted spongy condition as a bloom, pressing the said bloom to expel the adhering slag and melting the bloom with suitable additions for conversion into steel.

HARRY BAKER CLAPP.